United States Patent [19]
Gibbs et al.

[11] Patent Number: 5,529,349
[45] Date of Patent: Jun. 25, 1996

[54] MOUNTING APPARATUS WITH REDUCED RESISTANCE BEAD SEAL

[75] Inventors: Glen Gibbs, Warren; Paul E. Anglin, Troy, both of Mich.

[73] Assignee: ITT Corporation, New York, N.Y.

[21] Appl. No.: 235,666

[22] Filed: Apr. 29, 1994

Related U.S. Application Data

[63] Continuation-in-part of Ser. No. 111,980, Aug. 25, 1993.

[51] Int. Cl.⁶ .................................................. F16L 35/00
[52] U.S. Cl. .................... 285/332; 285/334.5; 285/354; 285/382; 72/317
[58] Field of Search ............................. 285/334.5, 332, 285/328, 354, 382; 29/503, 890.53, 890.15; 72/316, 317

[56] References Cited

U.S. PATENT DOCUMENTS

| | | | |
|---|---|---|---|
| 533,150 | 1/1895 | Trethewey et al. | 285/246 |
| 771,682 | 10/1904 | Sussman | 285/334.5 |
| 795,376 | 7/1905 | Von Stone | 285/328 |
| 1,058,542 | 4/1913 | Brown | 285/334.5 |
| 2,242,831 | 5/1941 | McIntosh | 72/317 |
| 2,267,416 | 12/1941 | Meukirch | 285/334.5 |
| 2,289,382 | 7/1942 | Parker | 285/334.5 |
| 2,685,461 | 8/1954 | Mueller | 285/334.5 X |
| 3,214,198 | 10/1965 | Peuchmaur | 285/334.5 X |
| 3,265,413 | 8/1966 | Currie | 285/334.5 X |
| 3,628,815 | 12/1971 | King | 285/334.5 X |
| 3,833,984 | 9/1974 | Dietzel | 29/890.15 |
| 4,054,157 | 10/1977 | Moseley | 285/354 X |
| 4,103,937 | 8/1978 | Wakefield | 285/382 X |
| 4,597,596 | 7/1986 | Tozer | 285/917 X |
| 4,598,937 | 7/1986 | Sugao | 285/334.5 |
| 4,693,502 | 9/1987 | Oetiker | 285/334.5 |
| 4,706,365 | 11/1987 | Hooton | 285/382 X |
| 4,842,310 | 6/1989 | Müffke et al. | 29/523 |
| 4,893,657 | 1/1990 | Usui | 285/334.5 |
| 4,907,830 | 3/1990 | Sasa et al. | 285/917 X |
| 4,980,961 | 1/1991 | Caudill | 72/316 |
| 5,002,316 | 3/1991 | Chohan | 285/917 |
| 5,052,719 | 10/1991 | Boehm | |
| 5,080,405 | 1/1992 | Sasa et al. | 285/903 X |
| 5,271,647 | 12/1993 | Usui | |
| 5,283,951 | 2/1994 | Davenport et al. | 29/890.15 |
| 5,354,107 | 10/1994 | Takikawa | 285/334.5 |

FOREIGN PATENT DOCUMENTS

| | | | |
|---|---|---|---|
| 318212 | 1/1902 | France | 385/328 |
| 550298 | 3/1923 | France | 285/328 |
| 1141975 | 9/1957 | France | 285/334.5 |
| 1196320 | 11/1959 | France | 285/334.5 |
| 2465941 | 3/1981 | France . | |
| 2906317 | 8/1979 | Germany | 285/903 |
| 14718 | of 1888 | United Kingdom | 285/328 |
| 22756 | 9/1893 | United Kingdom | 285/328 |
| 18976 | 10/1895 | United Kingdom | 285/328 |
| 21642 | 12/1912 | United Kingdom | 285/334.5 |
| 207865 | 5/1923 | United Kingdom | 285/328 |
| 224021 | 11/1924 | United Kingdom . | |
| 411328 | 6/1934 | United Kingdom . | |
| 443991 | 3/1936 | United Kingdom . | |
| 2032035 | 4/1980 | United Kingdom . | |
| 2140115 | 11/1984 | United Kingdom | 285/328 |
| 2261075 | 4/1993 | United Kingdom . | |

*Primary Examiner*—Randolph A. Reese
*Assistant Examiner*—Heather Chun Shackelford
*Attorney, Agent, or Firm*—Robert P. Seitter; J. Gordon Lewis

[57] ABSTRACT

A reduced resistance bead seal is integrally formed on a mounting surface of one of two matingly engageable members to form a leak-free seal between the two members despite any eccentricity or angular variances between the two members. In one embodiment, the reduced resistance bead is formed on an inner conical flange of an inverted flared end of a hollow fluid conduit. The bead may also be formed on the outer end flange of an ISO end flare. The bead presents a deformable surface as a fitting urges the flared end of the conduit into engagement with a conical seat in a receiver where eccentricity or angular variances exist between the flared end of the conduit and the conical seat. A unique method and a unique forming tool are used to form the reduced resistance bead in the flared end of the conduit simultaneously with the flaring of the end of the conduit.

38 Claims, 8 Drawing Sheets

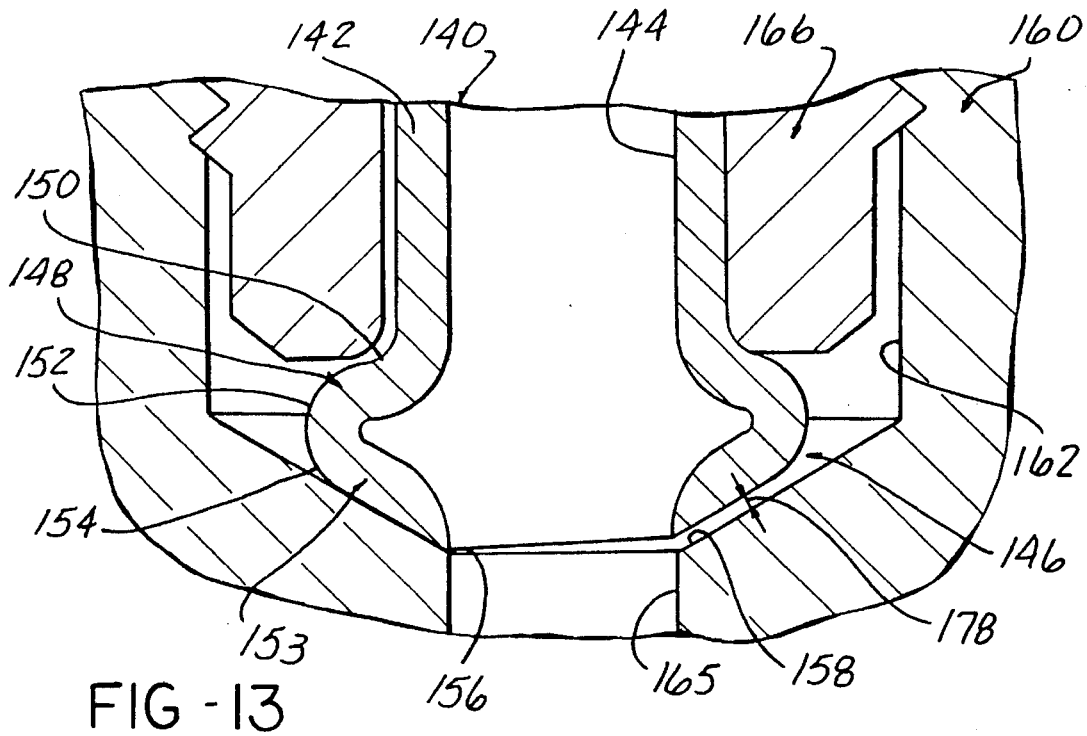
FIG-13 PRIOR ART
FIG-14
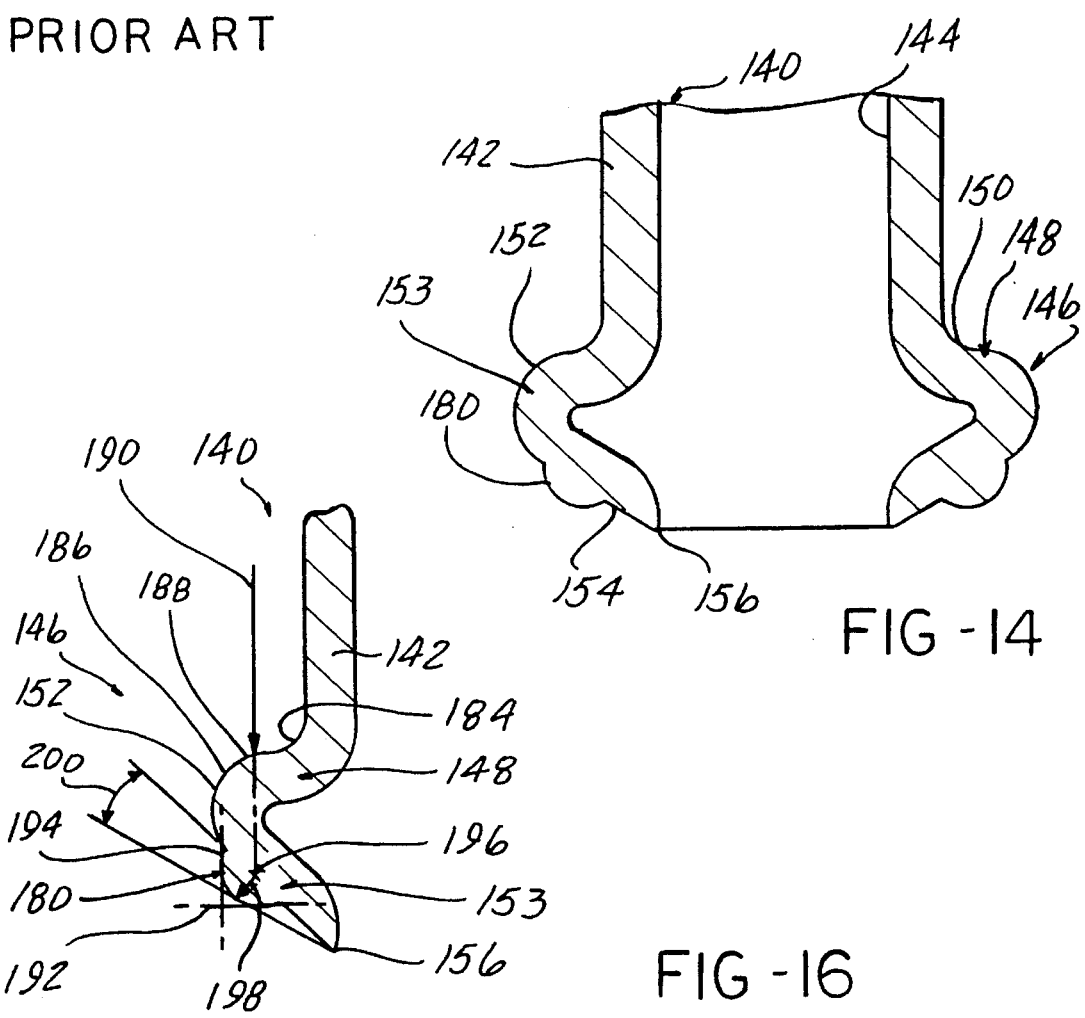
FIG-16

MOUNTING APPARATUS WITH REDUCED RESISTANCE BEAD SEAL

CROSS REFERENCE TO CO-PENDING APPLICATION

This application is a continuation-in-part of co-pending U.S patent application Ser. No. 08/111,980, filed Aug. 25, 1993 in the names of Paul E. Anglin and Glen Gibbs for "Mounting Apparatus With Reduced Resistance Bead Seal".

BACKGROUND OF THE INVENTION

1. Field of the Invention

The present invention relates, in general, to fluid conduits and, more specifically, to fluid conduit mounting apparatus.

2. Description of the Art

It is well known to flare the end of a fluid conduit to enable the end of the conduit to be easily attached to a suitable element, such as a valve, receiver, fitting, etc. In high pressure fluid conduits employed in vehicle brake and fluid lines, SAE standards require a double or inverted flared end on such conduits. In a double or inverted flared conduit, the end of the conduit is flared radially outward from the axial extent of the conduit and then an outer portion of the end is bent inward in parallel to and in registry with an outer surface of the flared end of the conduit to form a double flared wall at the end of the conduit with inner and exterior conical surfaces.

In a typical mounting arrangement, the double or inverted flared end of the conduit sealingly mates with a conically shaped seat in a female fitting, commonly referred to as a receiver. A bore in the receiver aligns with the bore in the conduit to form a fluid flow path therethrough. A male fitting is threadingly engaged with the receiver and also includes an internal conical surface which engages the exterior conical surface of the flared end of the conduit to urge the inner, folded over conically shaped flange of the flared end of the conduit into mating engagement with the conical seat in the receiver.

In the past, the fittings were made on lathes with rotating spindles such that the threads and the seal face or surface were machined on the same spindle. This method of processing produced concentric flare cone and thread center lines. However, current practice utilizes a more economical cold headed process for making the fittings and the separately processed rolled threads do not deliver the same high degree of concentricity as the more costly screw machine method.

The proper operation of such a fluid conduit fitting requires that the flared end of the conduit completely seat on the mating conical seat of the receiver about its full 360° surface. This is not always possible due to the aforementioned use of the cold headed process which does not deliver the same high degree of concentricity as the screw machine method of forming such fittings and receivers. Further, traditional manufacturing tolerance of TIR (total indicated runout) can result in an eccentric alignment of the flared end of the conduit and the mating conical seat of the receiver, despite such parts being within their specified manufacturing tolerances. A large TIR can create a gap extending along a predetermined angular extent of the adjacent conical surfaces of the conduit and the receiver which causes leaks in the fluid system.

In the past, when a leak occurred, it was common to apply more torque to the fitting to forcibly urge the fitting and thereby the entire conical surface of the flared end of the conduit into engagement with the conical seat of the receiver. However, such additional torque is not always able to be easily applied to the fitting. In the past, sealing was obtained by utilizing a soft material for either the conduit or the internal flare seat in the receiver. Typically, the conical flare seat in the receiver was made of brass or, in later years, a brass seat insert was mounted in a steel receiver body. The softer brass material of the conical flare seat deformed under increased torque applied to the fitting to enable the flared end of the conduit to be forced into mating contact with the conical seat over the full 360° extent of the conical seat despite any eccentricity which may exist between the flared end of the conduit, the conical seat or the axial alignment of the conduit with the conical seat in the receiver.

Newer receivers are formed primarily of steel, cast iron or anodized aluminum which are harder than brass typically used to form the conduit and not as deformable. Such receivers require higher torque to deform the flared end of the conduit into complete mating engagement with the conical seat of the receiver to form a leakproof annular seal between the mating surfaces thereof. Such increased torque is not always possible or desirable.

Similar problems arise in sealingly coupling a fluid conduit having an end flare constructed in accordance with International Organization Standardization Specifications ISO 4038-1977(E), hereafter "ISO". This type of end flare forms an enlarged, annular protrusion adjacent one end of the conduit which has a first angularly outwardly extending surface ending in an outer end at the maximum O.D. of the protrusion and a second, continuous, inwardly extending angular surface which terminates in a tip at one end of the conduit. The tip is designed to sealingly engage a conical seat in a receiver to sealingly couple the conduit to the receiver when a threaded fitting engages a threaded bore in the receiver and forcibly compresses the tip of the conduit against the conical seat in the receiver. If the surface finish of the tip of the flared end of the conduit and the conical seat in the receiver are sufficiently smooth and aligned, a seal can be made between the tip on the conduit and the conical seat in the receiver at relatively acceptable torques less than the yield point of the conduit.

In a fluid connector apparatus for an ISO flared conduit shown in FIG. 11, and 12 the included or open angle between opposed sides of the conical seat in the receiver is typically 120°. The included or open angle between opposed faces of the second surface of the flared end extending from the tip is typically 115°. As such, the metal to metal contact between the lip and the seat exists only along an annular ridge. Since the difference between the two diverging angles described above may vary between 1° and 9°, it can be seen that it is difficult to create a seal between the flared end of the conduit and the seat in the receiver without distorting the conduit or the receiver.

However, if the sealing surfaces are not sufficiently smooth or due to variations in the diverging angles of the conical seat and the flared end of the conduit, or any misalignment or eccentric stackup beyond the clearance of the tube in the bore of the fitting, the only way that the flared end of the conduit can be sealingly joined to the receiver is to apply higher levels of torque to the fitting to distort the tip of the flare or to indent the tip into the conical seat in the receiver.

When such eccentricities or surface imperfections exist, a gap will be formed between the flared end surface of the conduit and the conical seat in the receiver under normal torque loads. The application of higher torques to close the gap and create a seal between the conduit and the receiver cause a thinning of the wall on the flared end of the conduit which creates the susceptibility to fatigue failure during the life of the conduit and/or fluid coupling.

Thus, it would be desirable to provide a mounting arrangement for two mating elements which includes a reduced resistance bead on the mating surface of one of the elements to form a leakproof seal when the two elements are brought together into forced engagement. It would also be desirable to provide a unique flared end on a high pressure fluid conduit which creates a leak free seal with a mating surface or seat without the use of additional seal elements, increased tightening torque, special tools or modifications to the mating fitting elements. It would also be desirable to provide a flared end conduit having unique means for forming a leakproof seal with a mating surface of another element, which means is integral with the conduit so as to always be present with the conduit, which eliminates any additional manufacturing operations required to assemble the seal, and which is formed of the same material as the conduit. It would also be desirable to provide a seal on the flared end of a fluid conduit which is deformed under normal or even reduced torque to account for eccentricity and angular variances between the mating surfaces of the fitting and the conduit end. It would also be desirable to provide a reduced resistance seal which is usable on a number of different fluid conduit end configurations including an inverted SAE flare, a modified O-ring face or an ISO flare. Finally, it would be desirable to provide a mounting apparatus, method and tool which provides a unique seal element on the flared end of a fluid conduit for forming a leakproof seal with a mating element which is manufacturable using conventional methods and techniques.

SUMMARY OF THE INVENTION

The present invention is a mounting apparatus having a unique seal element for forming a leakproof seal between the mating mounting surfaces of two joined members despite any eccentricity, angular variances or misalignment of the two joined members.

In one embodiment, first and second members have first and second matingly engageable mounting surfaces, respectively. A reduced resistance bead, preferably an annular bead, is integrally formed with one of the members as a continuous one-piece part of the member and extends outward from the mounting surface of the member to form a deformable seal between the two members when the two members are forcibly joined together. The reduced resistance bead may take one of a number of different shapes, including an arcuate shape, i.e., spherical or elliptical, as well as various polygonal shapes, such as generally rectangular, trapezoidal, etc.

In a specific application, the first member has a first end extending at a predetermined angle from the axial extent of the first member. A first mounting surface is formed on the first end of the first member for mating engagement with the mounting surface of the second member. The reduced resistance bead is formed on the mounting surface of the first member. In this application, the first member may comprise a fluid conduit in which the first end flares radially outward in a single flange from the axial extent of the conduit, at a predetermined angle, such as 45°. The first end of the conduit may also be formed as a double or inverted flared end with an outer conical flange and an inner conical flange formed as a continuous extension of the outer flange and disposed radially inwardly of and in registry with the outer flange. The reduced resistance bead is formed on and extends outward from the inner flange.

The present invention is also usable with a fluid conduit having a different end flare construction in the form of an enlarged diameter, annular protrusion adjacent one end of the conduit. The protrusion is formed of a first outwardly radially extending surface extending from the axial extent of the conduit and terminating in an outer end. A second radially inward extending surface extends from the outer end and terminates in an annular tip at one end of the conduit. A hollow bore extends through the conduit and the tip. The reduced resistance seal means is integrally formed as a continuous, one-piece extension of the conduit on the second exterior surface of the flared end of the conduit, with the reduced resistance seal means extending outward from the second exterior surface of the flared end of the conduit. In a preferred embodiment, the reduced resistance seal means is in the form of an annular bead integrally formed as a one-piece extension of the parent material of the conduit.

The annular bead is preferably located at a position along the length of the second exterior surface of the flared end of the conduit between the outer end of the flared end and a position in line with a flat formed on the first exterior surface between a first arcuate surface extending from the axial extent of the side wall of the conduit and a second arcuate surface forming the outer end of the flare. Preferably, the annular bead is located axially in line with the flat on the first exterior surface of the flare such that compressive force exerted by a fitting on the flat when the fitting and flared end of the conduit are mounted in a suitable receiver is directed through solid material in the outer wall of the conduit directly to a radial center of the annular bead.

In this application, the annular bead has a radius or maximum height from the second exterior surface of the flare which is substantially one third of the wall thickness of the conduit. Further, the height or radius of the bead is selected so that the outer surface of the bead engages a conical seat in the receiver before the tip on the conduit engages the conical seat to ensure a complete seal at reduced torque levels. The bead serves as a redundant seal in combination with the tip on the flared end of the conduit.

The present invention also comprises a fluid conduit connector apparatus which includes a fluid conduit having a first end flared radially outward from the diameter of the conduit to an enlarged diameter. The flared end of the conduit has a first exterior flange with a first conical exterior surface formed thereon. In a double or inverted flare conduit a portion of the flared end of the conduit is bent inwardly from the first exterior flange into registry with the first flange to form an inner flange having a second conical surface thereon disposed substantially parallel to the first conical surface of the first exterior flange. A seal element in the form of a reduced resistance bead is integrally formed as a continuous part of the inner flange and extends outward from the second conical surface of the inner flange. A first fitting having a through bore for receiving the fluid conduit therethrough has a conical surface engageable with the first conical surface on the flared end of the conduit. In a single flared end conduit, the bead is formed on the inner or second conical surface of the single end flange. A receiver means has a conical seat for matingly receiving the second conical surface of the fluid conduit thereon. Means are provided for forcibly attaching the fitting to the receiver means to thereby force the conical surface of the fitting into engagement with the first exterior conical surface of the conduit and the second conical surface of the conduit into engagement with the conical seat of the receiver means.

If any eccentricity or angular variances exist in the first and second conical surfaces of the conduit, the conical surface of the fitting, or the conical seat of the receiver means when such elements are engaged with each other, the softer of the conical seat or the reduced resistance bead on the conduit will deform to enable the second or inner conical surface of the conduit to completely seal over its full 360° annular extent with the conical seat of the receiver means.

A fluid conduit connector apparatus is also disclosed for use with a conduit having a flared construction described above which includes an enlarged, annular protrusion terminating in a radially inwardly extending tip. In this application, the reduced resistance seal means or annular bead formed on and extending outward from the second exterior surface of the end flare on the conduit acts as a redundant seal in combination with the tip end of the conduit. In this application, any gap which may exist between the tip of the conduit and the conical seat in the receiver due to eccentricity, stackup tolerances or variations, etc., will be closed by the annular bead which deforms under normal or reduced torque levels to close the gap and sealingly couple the flared end of the conduit to the receiver.

Also disclosed in the present invention is a method of forming a seal element on a flared end on a fluid conduit. The method comprises the steps of:

a) flaring the first end of a hollow fluid conduit radially outward from the axial extent of the conduit;

b) bending a portion of the first end of the conduit inward on itself to form exterior and inner substantially parallel conical surfaces on the first end of the conduit; and c) forming a reduced resistance bead on the inner conical surface of the conduit extending outward from the inner conical surface.

Preferably, the step of forming the reduced resistance bead is performed simultaneously with the step of bending the first end of the conduit inward on itself.

This method may be modified by eliminating step (b) for a single flared end conduit and forming the bead on the inner surface of the single flared end of the conduit.

The present invention also describes a method of forming a reduced resistance section on any component. According to this method, first and second members are formed with first and second mounting surfaces, respectively. A reduced resistance bead is formed on the mounting surface of one of the members and extends outward from the mounting surface for engagement with the corresponding mounting surface of the other member when the two members are forcibly engaged.

Also disclosed is a unique tool for forming a reduced resistance bead in a hollow fluid conduit having a flared end with folded over, substantially parallel, inner and outer flanges. The tool includes a shank having a conical surface formed at one end. A recess is formed in the conical surface having a predetermined shaped cross section to form a reduced resistance annular bead when the tool is forcibly urged into the flared end of the fluid conduit. A piloting nose is mounted at the end of the conical surface.

The present invention provides a unique mounting apparatus which provides a leak free seal between the mating surfaces of two elements despite any eccentricity, angular variances, or misalignment of the two elements. Such leak resistance or leak free sealing is provided at normal and even reduced joint loading torques or forces. The use of an annular reduced resistance bead formed on the mounting surface of one element also provides a longer seal path.

The mounting apparatus of the present invention is particularly useful on the flared ends of fluid conduits which are sealingly attached to receivers by means of fittings. The present invention provides a leak free seal between the mating surfaces of the flared end of the conduit and a conical seat in the receiver even if eccentricity or angular variances exist between the conical mating surfaces of the conduit and the conical seat of the receiver.

The reduced resistance section or bead provides improved sealing and leak resistance without the use of increased loading forces on the fitting which necessitate metal deformation of the fitting and/or special tooling or the use of separate seal members, all adding to the cost of the fitting assembly. The reduced resistance bead is integrally formed with the conduit so as to always be present with the conduit so as to eliminate any separate assembly steps for attaching a seal element to the conduit. Further, the reduced resistance bead is integrally formed with the conduit so as to be constructed of the same material as the conduit thereby eliminating any design or use considerations relating to different deterioration rates of disparate materials.

A conduit or member having the reduced resistance bead of the present invention formed thereon is usable as a direct, drop-in replacement for similar conduits or members without modification to the fitting, receivers or assembly methods associated with such components.

Finally, the reduced resistance annular bead is angular tolerant in that it seats in a centered mounting arrangement or a conical seat or surface despite any eccentricity or angular variances between the conduit and the mating seat or surface.

BRIEF DESCRIPTION OF THE DRAWING

The various features, advantages and other uses of the present invention will become more apparent by referring to the following detailed description and drawing in which:

FIG. 13 is a partial, enlarged view, similar to FIG. 12, but showing the formation of a gap between the end flare and the receiver due to tolerance variations, eccentricity, etc.;

FIG. 14 is an enlarged, longitudinal cross sectional view of a conduit with an ISO end flare having a reduced resistance bead of the present invention formed thereon;

FIG. 16 is a partial view of FIG. 14;

DESCRIPTION OF THE PREFERRED EMBODIMENTS

The present invention is directed to the formation of a seal between the mating surfaces of two elements which creates a leak free seal despite any eccentricity, angular variance, or misalignment between the mating surfaces of the two elements.

Figure 1:
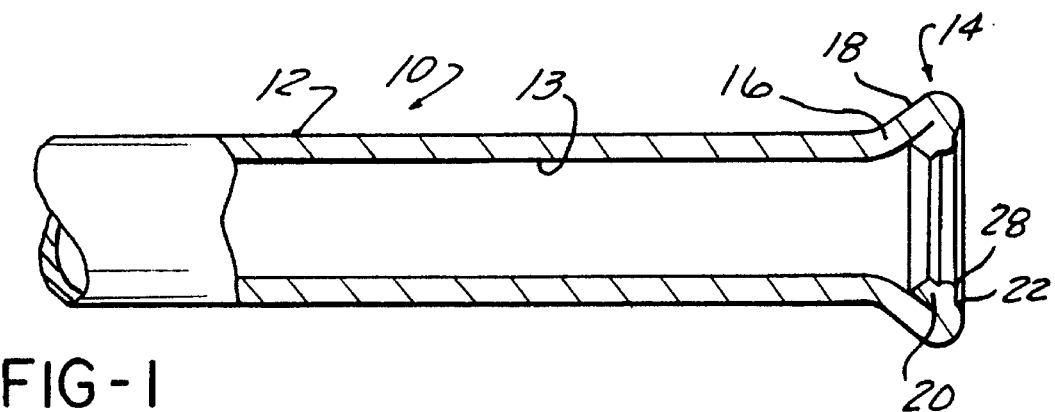
FIG. 1 is a cross sectional view of a fluid conduit having a reduced resistance bead of the present invention formed on the flared end thereof.

Referring now to FIG. 1, there is depicted one example of the use of the present invention on the flared end of a fluid conduit 10. It will be understood, as described in greater detail hereafter, that the present invention may also be employed with other types and shaped elements.

The fluid conduit 10 is typical of a conduit design to carry fluid, such as air, hydraulic fluid, etc., under pressure. The conduit 10 typically has a circular cross section with an internal bore 13 formed by a side wall 12. The conduit 10 may have any thickness side wall 12, I.D. and O.D.. Further, the conduit 10 may be formed by any metallic material, such as steel, aluminum, copper, etc.

As is conventional, the conduit 10 has a first end 14 having an opening therein which communicates with the internal bore 13 of the conduit 10. The first end 14 is flared radially outward at a predetermined angle to enable the first end 14 of the conduit 10 to be sealingly mounted to another member, such as a receiver in an example described in greater detail hereafter.

According to SAE standards for the use of high pressure fluid conduits in vehicle brake lines, fuel lines, etc., the first end 14 of the conduit 10 is flared outward, from the axial extent of the conduit 10 at a 45° angle. It will be understood that any other angle may be employed with the present invention, including flared end angles greater than 0° and up to 90° or more.

As shown in FIG. 1 for one embodiment of the present invention, the first end 14 of the conduit 10 has a double or inverted flared end construction formed of an exterior flange 16 having an exterior conical-shaped surface 18. A portion of the first end 14 is folded or bent inward onto itself to form an inner flange 20 which is disposed in registry with and parallel to the exterior flange 16. The inner flange 20 forms an inner conical surface 22 which is desirably parallel to the exterior surface 18 of the exterior flange 16. The inner conical surface 22 is designed to sealingly mate with a correspondingly formed conical seat on a mating element, such as a receiver in metal-to-metal contact.

Figure 8:
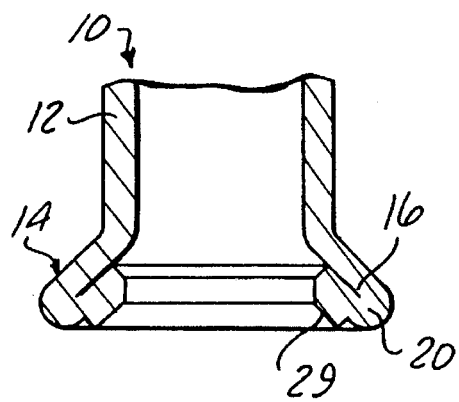
FIG. 8 is a partial, enlarged view, showing an alternate configuration of the reduced resistance bead shown in FIG. 1.

Ideally, the inner and outer surfaces 22 and 18, respectively, on the conduit 10 are arranged in parallel and concentric to each other and to the axial center line of the conduit 10. However, due to manufacturing tolerances, manufacturing variations, and variations in the material used to form the conduit 10, eccentricity or angular variances between these surfaces and with the mating, conical seat may exist. The present invention uniquely provides a compressive bead seal or bead 28 having a reduced resistance which is integrally formed as a unitary part of the inner flange 20. The bead 28 extends outward from the inner flange 20 as shown in FIG. 1. Further, the bead 28 may have any one of a number of different shapes or cross sections. For example, the bead 28 may have an arcuate shape, such as the illustrated spherical shape or an elliptical shape. Alternately, as shown in FIG. 8, the bead 28 may have a generally polygonal shape, such as a trapezoidal, triangular, rectangular, rhombic, etc., denoted by reference number 29 with flat sides. In addition, although one annular bead 28 is shown in FIG. 1, multiple beads having the same or different cross section shapes, as described above, may also be formed on the inner flange 20 of the conduit 10.

The reduced resistance bead 28 provides a smaller volume of material than that of the entire inner flange 28 of the conduit 10 so as to be easily deformable itself or to easily deform a softer mating element to conform the first end 14 of the conduit 10 to a mating element to form a leak free seal therebetween. By example only, the reduced resistance bead 28 has a modulus of resiliance=15.0, a relative toughness 15,700 and a total resiliance of bead seal=0.0200265.

Figure 2:
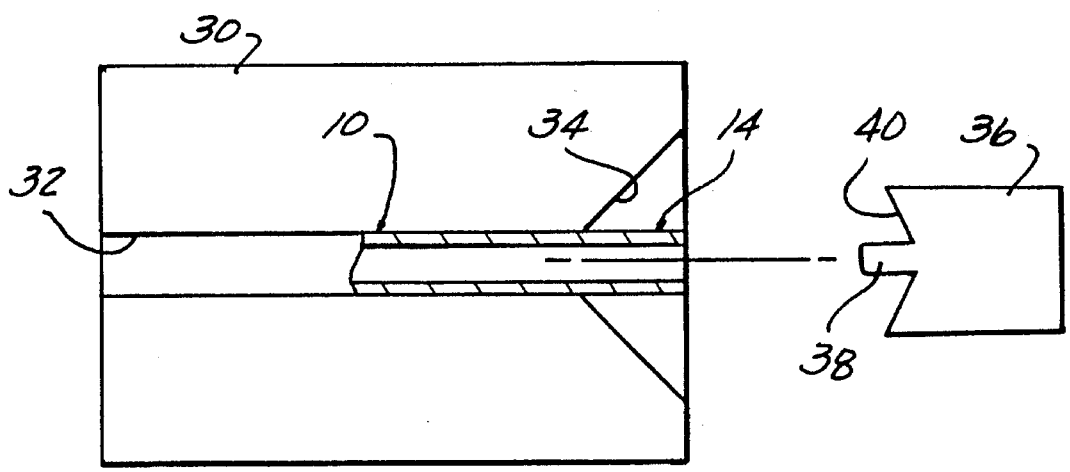
FIG. 2 is a plan view showing the first step in a method of forming the flared end of a conduit with a reduced resistance bead shown.
Figure 3:
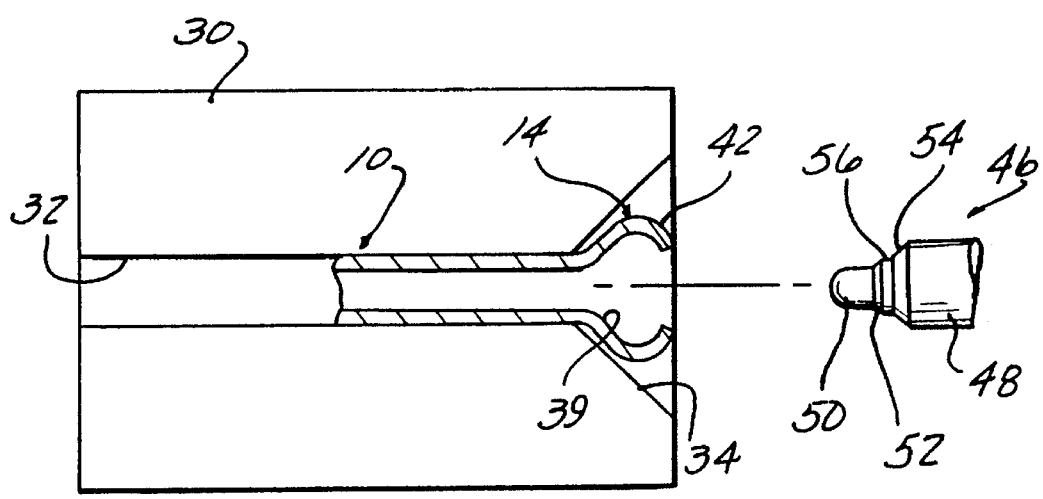
FIG. 3 is a plan view of a second step in the method of the present invention showing the formation of the reduced resistance bead on the inverted flared flange end of the conduit formed in FIG. 2.
Figure 4:
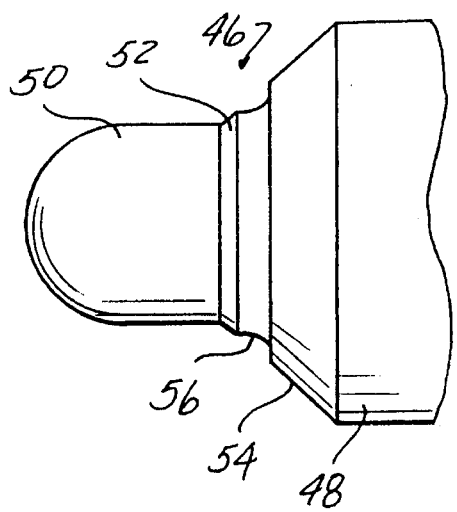
FIG. 4 is an enlarged view of a unique tool used to form the reduced resistance bead in the inverted flange of the conduit shown in FIG. 3.

FIGS. 2, 3 and 4 depict a method and an unique tool used to form the reduced resistance bead 28 as well as to flare the first end 14 of the conduit 10 to the shape shown in FIG. 1.

In FIG. 2, one of a pair of holding blocks 30 is depicted. The holding block 30 includes an elongated groove or bore 32 of circular cross section for receiving the conduit 10 therein. The bore 32 extends continuously to flared end walls 34 which are disposed at a predetermined angle, such as 45°, from the axial extent of the bore 32. The conduit 10 is mounted in the holding block 30, with the unformed first end 14 disposed adjacent one end of the holding block 30 in the flared end wall portion 34. A mating holding block 30 is then secured to the holding block 30 shown in FIG. 2 and a tool, such as a punch 36, is forcibly urged against the first end 14 of the conduit 10.

The punch 36 can be formed with a reverse angled face 40, spaced from the end of a pilot nose 38, which angled face 40 engages the end 14 of the conduit 10 and forces the end of the conduit 10 radially inward as shown in FIG. 3.

In FIG. 3, the same or a different pair of holding blocks 30 are used in a second step of the present method. After the end 14 of the conduit 10 has been flared radially outward and the outer end portion thereof bent inwardly, as shown in FIG. 3, a different and unique tool 46 is employed to complete the flaring as well as to form the reduced resistance bead 28 in the first end 14 of the conduit 30. As shown in FIG. 3, and in greater detail in FIG. 4, the tool 46 is formed with a generally cylindrical shank 48. A conical surface formed of a first conical section 52 and a spaced, second conical section 54 are formed on one end of the shank 48 and extends axially therefrom. A piloting nose 50 having an O.D. smaller than the I.D. of the conduit 10 is formed at the end of the first conical surface 52 and serves to center the tool 46 in the conduit 10.

A recess 56 is formed between the first and second conical surfaces 52 and 54. The recess 56 forms the reduced resistance bead 28 in the inner flange 20 of the conduit 10 when the tool 46 is forcibly urged into the conduit 10 mounted in the pair of holding blocks 30. Thus, the recess 56, although being illustrated as having a generally arcuate or spherical cross section, may be formed in any one of the above-described shapes to provide the desired shaped reduced resistance bead 28.

In use, when the tool 46 is forcibly urged into the first end 14 of the conduit 10 mounted in the holding blocks 30, the first and second conical surface portions 52 and 54 bend the partially folded over flange 42 of the conduit 10 back on itself into registry with the outer flange 16 of the conduit 10 until the outer flange 16 is disposed in registry with the flared end walls 34 of the holding blocks 30. This forms the outer and inner flanges 16 and 20 at the desired flared angle, such as 45°, as described above. At the same time, the forced engagement of the tool 46 with the conduit 10 extrudes a portion of the conduit metal in the first end 14 of the conduit 10 from the inner flange 20 into the recess 56 in the tool 46 to form the reduced resistance bead 28 having a shape corresponding to the shape of the recess 56.

Besides using the tool 46 to extrude the bead 28 from the end of the conduit 10, the bead can also be formed by machining to the desired shape.

Figure 5:
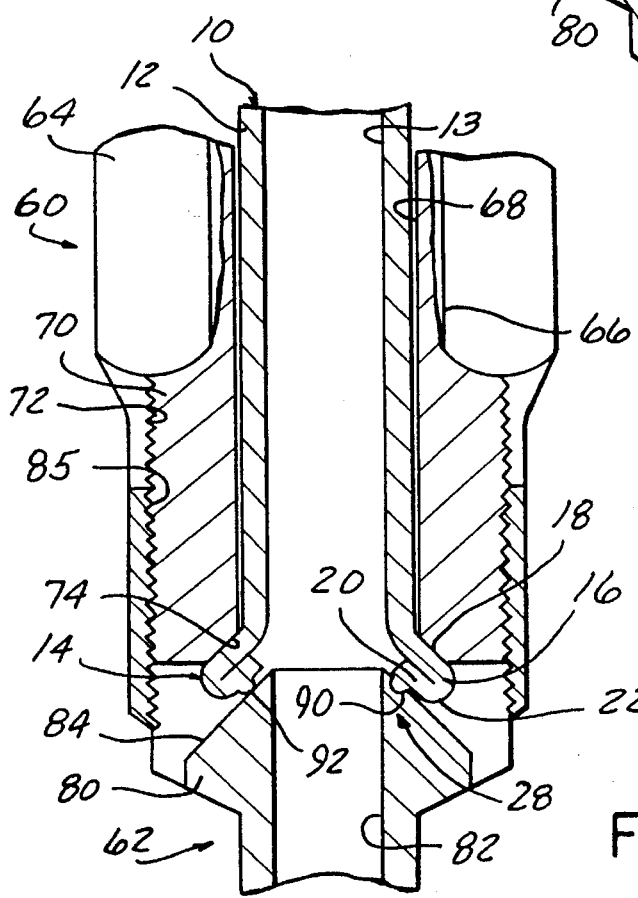
FIG. 5 is a cross sectional view showing the assembly of the conduit shown in FIG. 1 with a fitting and receiver.

Referring now to FIG. 5, there is depicted an exemplary application of the conduit 10 having a reduced resistance bead 28 formed thereon according to the method described above. In this application, the conduit 10 is connected in sealing engagement by a fitting 60 to a receiver means 62. The fitting 60 is in the form of a body 64 having a plurality of hex-shaped flats 66 formed exteriorly thereon. A bore 68 extends through the body 64 and loosely receives the conduit 10 therethrough, the I.D. of the bore 68 being slightly greater than the O.D. of the conduit 10. An end portion 70 of the body 64 of the fitting 60 extends from the hex flats 66 and has external threads 72 formed thereon. An inner conical surface 74 is formed on the end portion 70 adjacent the exterior end thereof. The conical surface 74 engages the conical surface 18 on the outer flange 16 of the conduit 10, as shown in FIG. 5.

The receiver means 62 may comprise any mounting member to which a fluid conduit 10 is mounted. Thus, the receiver means 62 may comprise a block, valve, etc. A seat 80 is formed within the receiver means 62 and surrounds a through bore 82 which is alignable with the bore 13 in the conduit 10. The seat 80 has an annular, conical end face 84 which matingly engages the reduced resistance bead 28 and/or the inner conical surface 22 of the conduit 10. A plurality of threads 85 are formed internally within an annular end of the receiver means 62 for mating engagement with the threads 72 of the fitting 60 to join the fitting 60 to the receiver means 62 as well as to apply torque to forcibly engage the first end 14 of the conduit 10 with the conical seat 80 in the receivers means 62. Other means for clamping or joining the fitting 60 to the receiver means 62 may also be employed.

In use, the axial extent of the conduit 10 is first slid into the bore 68 in the fitting 60 prior to the fitting 60 being threadingly joined to the receiver means 62. Torque applied to the fitting 60 by means of a tool engaged with the hex flats 66, forcibly urges the conical surface 74 in the fitting 60 into engagement with the exterior conical surface 18 on the first end 14 of the conduit 10 and forces the opposed inner conical surface 22 of the inner flange 20 of the conduit 10 into engagement with the conical surface end face 84 of the seat 80 in the receiver means 62.

Assuming that all of the components are manufactured within specified manufacturing tolerances, such that, the mating conical surfaces 74 and the fittings 60, the exterior conical surface 18 and the inner conical surface 22 of the conduit 10 and the surface 84 of the seat 80 in the receiver means 62 are concentric with each other, a predetermined amount of force applied to the fitting 60 will be sufficient to concentrically dispose the inner surface 22 of the first end 14 of the conduit 10 into metal-to-metal contact with conical end the face 84 of the seat 80 in the receiver 62 to form a leak-free seal therebetween.

However, it is more likely that one of the conical faces is eccentric, or varies angularly, or the conduit 10 is not co-axially aligned with the seat 80 in the receiver 62. The reduced resistance bead 28 of the present invention overcomes any eccentricity or angular variances which may exist between the mating conical surfaces and functions in one of two different ways, depending upon which material forming the conical seat 80 and the receiver 62 or the material forming the conduit 10 is softest. In FIG. 5, it is assumed that the conical seat 80 in the receiver 62 is softer than the material forming the conduit 10. When eccentricity or angular variances exist between the mating conical surfaces, torque applied to the fitting 60 will urge a predetermined angular portion of the reduced resistance bead 28, as indicated generally by reference number 90 in FIG. 5, into and deforming a portion of the conical seat 80 in the receiver 62. This deformation continues until the remaining annular extent 92 of the bead 28 sealingly engages the remainder of the conical end face 84 of the seat 80 to form a leak-free seal therebetween. It should be noted that the arcuate shape of the example of the bead 28 shown in FIG. 5 creates a longer seal path for increased leak resistance as compared to the length of the inner conical surface 22 of the conduit 10.

Figure 6:
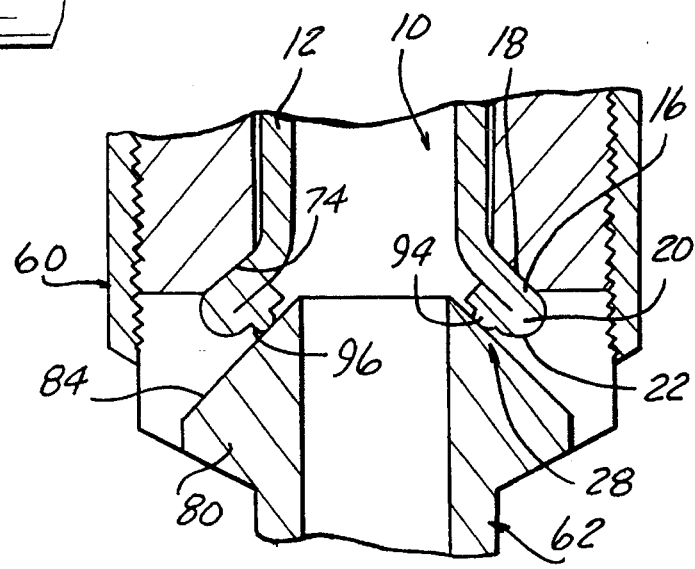
FIG. 6 is a partial, enlarged view, similar to FIG. 5, but showing a different sealing arrangement of the reduced resistance bead on the conical seat of the receiver.

If the conduit 10 is formed of a softer material than the seat 80 of the receiver 62, a different deformation occurs if eccentricity or angular variances exist between the mating surfaces, as shown in FIG. 6. In this example, when the fitting 60 forcibly urges the flared end 14 of the conduit 10 into engagement with the surface 84 of the conical seat 80, a portion of the reduced resistance bead 28, as shown by reference number 94 in FIG. 6, will deform itself. Such deformation will occur over a predetermined angular extent of the bead 28 until the opposed portion of the bead 28, as shown by reference number 96, sealingly engages the surface 84 of the seat 80 to form the desired leak-free seal between the conduit 10 and the seat 80 of the receiver means 62.

It should be noted that in both examples shown in FIGS. 5 and 6, regardless of which element undergoes deformation when the flared end 14 of the conduit 10 is forcibly urged into sealing engagement with the seat 80 in the receiver means 62, the reduced resistance bead 28 has a smaller volume of material as compared to the larger volume of the entire inner flange 20 of the first end 14 of the conduit 10 so as to more easily undergo deformation itself, as shown in FIG. 6, or to more easily cause deformation in the seat 80, as shown in FIG. 5. This substantially reduces the amount of torque needed to be applied to the fitting 60 to forcibly urge the conduit 10 into complete leak-free sealing engagement with the seat 60 in the receiver means 82.

This increased leak resistance with the same or less amount of applied torque was established by tests run on a number of samples of a conventional double or inverted flared end conduit without the reduced resistance bead 28 of the present invention and samples of a conduit 10 having the reduced resistance bead 28 constructed as shown in FIG. 1. The test samples without the reduced resistance bead required an average of 11.17 newton meters of torque to achieve a leak-free seal between the conduit and the receiver seat. The samples of the conduit 10 utilizing the reduced resistance bead 28 of the present invention required only an average of 6.83 newton meters to achieve the leak-free seal. This represents a reduction of approximately 39% in the amount of torque required to sufficiently tighten the fitting 60 to the receiver 62 to form a leak-free seal between the flared end 14 of the conduit 10 and the seat 80. Even when statistical corrections are made to the test averages to account for the sample size, a conduit 10 having the reduced resistance bead 28 of the present invention thereon still shows a required torque force of approximately 31% less than that required for the conventional conduits lacking the reduced resistance bead 28.

Figure 7:
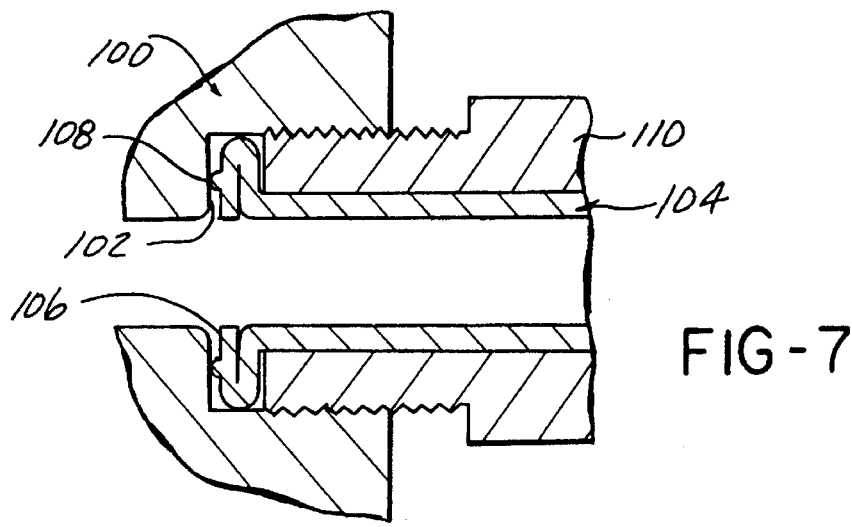
FIG. 7 is an elevational view showing the use of a reduced resistance bead of the present invention with two mating members.

FIG. 7 depicts the use of a reduced resistance bead of the present invention on other shaped elements not having conical mounting surfaces. In FIG. 7, a first member 100 is provided with a first mounting face or surface 102. A second member 104 is provided with a corresponding mounting face or surface 106. As shown in FIG. 7, the mounting surfaces 102 and 106 are arranged at a 90° angle with respect to the remaining portions of each member 100 and 104.

A reduced resistance bead 108 is formed on one of the members such as member 104, and extends integrally outward from the mounting surface 106 of the member 104. Suitable joining means, such as a fitting 110 which threadably engages a threaded bore in the first member 100, are employed to forcibly connect the first and second members 100 and 104 in mating engagement. The reduced resistance bead 108 functions in the same manner as the bead 28 described above and undergoes deformation or causes deformation in the mounting face 102 of the member 100 to account for any eccentricity or angular variances between the two members 100 and 104 and to provide a leak-free seal between the metal-to-metal engaged surfaces 102 and 106 of the members 100 and 104.

Figure 10:
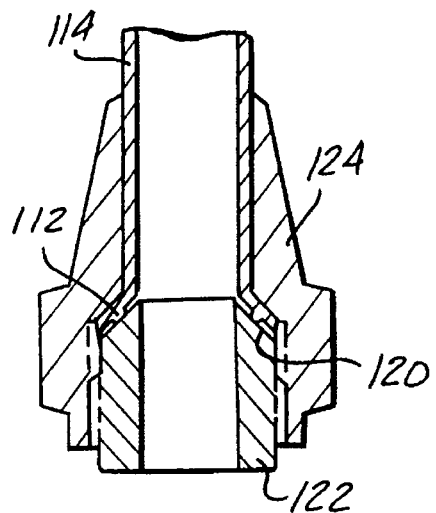
FIG. 10 is a cross sectional view showing the conduit depicted in FIG. 9 mounted in a two piece tube assembly.
Figure 9:
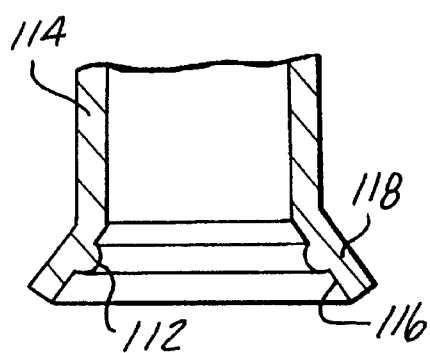
FIG. 9 is a partial, enlarged view showing a reduced resistance bead of the present invention on a single flared end conduit.

FIGS. 9 and 10 depict the use of a reduced resistance seal or bead 112, identical to the bead 28 described above, on a single flared end conduit 114. In this application, the bead 112 is integrally formed on the inner conical surface 116 of the single flared end flange 118 of the conduit 114. The bead 112 sealingly engages a conical mounting surface 120 formed in a receiver 122 which is one part of a conventional two piece tube assembly also including a fitting 124. The fitting 124 and receiver 122 function in the same manner as the fitting 60 and receiver 62 shown in FIG. 5 to sealingly mount the single flared end flange 118 of the conduit 114 to the receiver 122.

Other fitting/receiver assemblies, such as a three piece assembly employing an additional sleeve or collar, may also be employed with either of the conduits 10 and 112 having the reduced resistance seals or beads of the present invention formed thereon.

Figure 11:
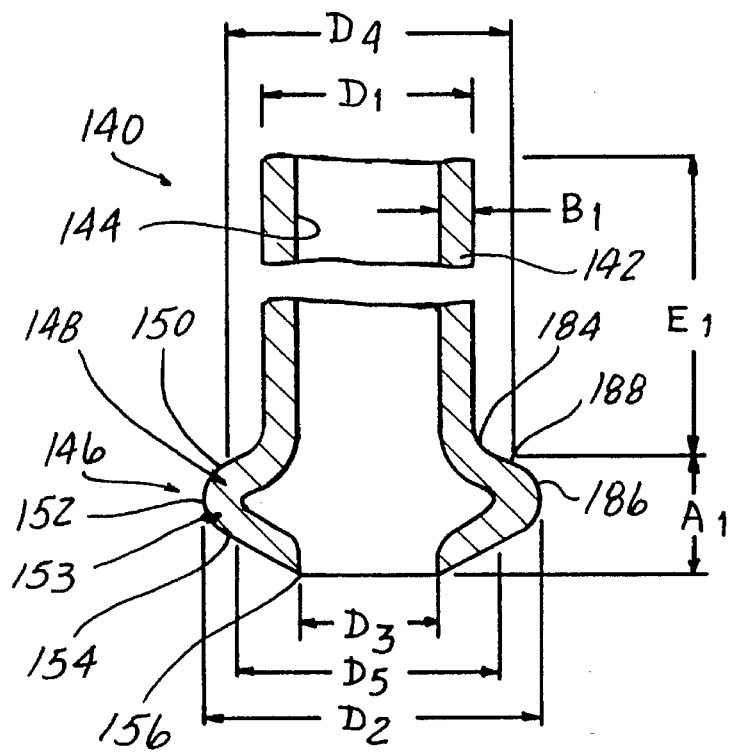
FIG. 11 is a longitudinal cross sectional view showing a prior art conduit having an ISO end flare.

FIG. 11 depicts a prior art fluid conduit having an end flare constructed according to International Organization Standardization Specifications ISO 4038-1977(E), hereafter (ISO). As is conventional, the conduit 140 comprises a thin walled hollow tube having an axially extending side wall 142 and a hollow internal bore 144. An ISO flare 146 is formed at one end of the conduit 140 and includes a first outwardly extending portion 148 which extends angularly outward from the axial extent of the side wall 142. The first angular outward extending portion 148 includes a first exterior surface 150. The first, outward extending portion 148 terminates in an arcuate outer end 152 which is disposed at the maximum O.D. of the end flare 146. A second, angularly inward extending portion 153 extends from the outer end 152 and terminates in a tip 156 at one end of the conduit 140. A second exterior surface 154 is formed on the second inward extending portion 153.

Figure 12:
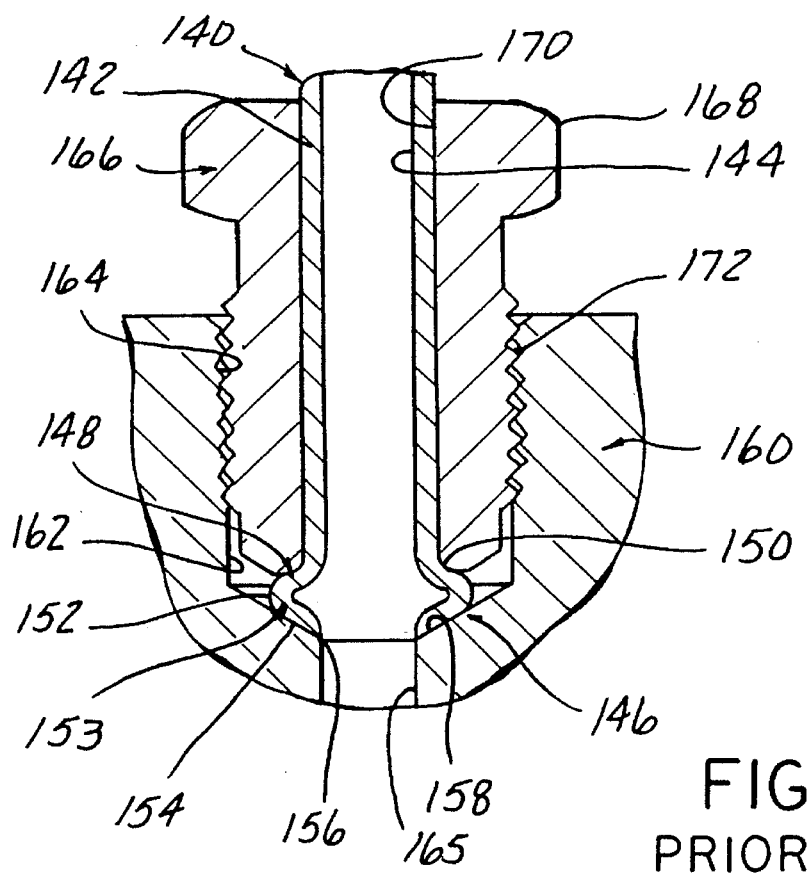
FIG. 12 is a cross sectional view showing a prior art conduit having an ISO end flare mounted in a receiver by means of a threaded fitting.

When the first outwardly extending portion 148 is formed on the conduit 140, a first radius 184 extends arcuately outward from the axial extent of the wall 142 of the conduit 140. The opposite end of the first outwardly extending portion 148 terminates in a radius 186 which curves smoothly to the outer end 152. A flat 188 is formed between the radii 184 and 186. The flat 188 is generally perpendicular to the longitudinal axis of the conduit 140. As shown in FIG. 12, compressive force exerted by the fitting 166 onto the flare 146 to compressively engage the tip 156 with the conical seat 158 is centered on the flat 188.

The nominal dimensions and tolerances for the conduit 140 and the end flare 146 are shown in Table 1. The dimension reference symbols $A_1$, $B_1$, $D_1$–$D_5$ and $E_1$ are also shown in FIG. 11.

TABLE 1

DIMENSIONS AND TOLERANCES FOR TUBING AND END FLARE (mm)

| Bare Tube O.D. ±0.07 | $D_1$ Coated Tube O.D. max | $D_2$ ±0.18 | $D_3$ +0.3 −0.2 | $D_4$ | $D_5$ min | $A_1$ ±0.3 | $B_1$ 0.07 | $E_1$ min |
|---|---|---|---|---|---|---|---|---|
| 4.75 | 4.87 | 7.1 | 3.2 | 6.0 | 5.5 | 2.5 | 0.70 | 16 |
| 6.00 | 6.12 | 8.4 | 4.5 | 7.3 | 6.8 | 2.5 | 0.70 | 18 |
| 8.00 | 8.12 | 10.7 | 6.5 | 9.3 | 8.8 | 2.7 | 0.70 | 24 |
| 10.00 20 | 10.12 | 12.7 | 8.5 | 11.3 | 10.8 | 3.0 | 0.70 | 28 |

The conduit 140 is sealingly connected to a conical surface or seat 158 in a receiver 160 as shown in FIG. 12. As described above, the receiver 160 includes a bore 162 having a plurality of threads 164 disposed along an outer end thereof. A fitting 166 is provided with a hex head 168, a hollow bore 170 which receives the conduit 140 and a plurality of threads 172 which threadingly engage the threads 164 in the receiver 160 to compress and sealingly engage the tip 156 on the end flare 146 of the conduit 140 with the conical seat 158 in the receiver 160. A hollow bore 165 is formed in the receiver 160 for communication with the hollow bore 144 in the conduit 140.

FIG. 12 depicts the orientation of the conduit 140, the receiver 160 and the fitting 166 in a nominal position when all of the components are made to nominal dimensions or the variation of the tolerance brings the combinations near nominal. This achieves a fluid tight joint or seal between the tip 156 on the conduit 140 and the conical seat 158 in the receiver 160 with reasonable torque applied to the hex head 168 of the fitting 166.

However, it is difficult to consistently achieve the perfect combination of component tolerances and component orientation shown in FIG. 12. As shown in FIG. 13, when the tolerances of the components stack up in an unfavorable direction, and the rotational orientation of the components is aligned, an annular portion of the tip 156 on the conduit 140 will engage the inner edge of the conical seat 158 in the receiver 160 for a certain circumferential extent along the tip 156 and the conical seat 158. However, a gap denoted generally by reference number 178 will be formed between the conical seat 158 and the remaining circumferential extent of the annular tip 156 on the conduit 140. When this condition is encountered, the only means of obtaining a seal in the prior art was to "over torque" the fitting 166 to either distort the flare end portion 146 of the conduit 140 or to cause the tip 156 of the conduit 140 to dig into the conical seat 158 in the receiver 160. However, this "over torquing" of the fitting 168 leads to potential problems in achieving a long life seal between the flared end 146 of the conduit 140 and the conical seat 158 in the receiver 160.

In a nominal size fluid conduit 140 having an ISO flared end 146, as shown in FIGS. 11, 12 and 13, torque requirements of 15 newton meters, plus 3 newton meters, minus zero, are specified to achieve a proper seal between the conduit 140 and the conical seat 158 in the receiver 160 without deformation of the tip 156 or flare 146. When the gap 178 occurs, as shown in FIG. 13, and "over torquing" is applied to the hex flats 168 on the fitting 166, the additional torque above 19 to 20 newton meters causes the back side of the flare 146 adjacent the first outwardly extending portion 148 to begin to yield and distort. At the same time, the tube wall in the second inward extending portion 153 begins to thin. From this point on, any additional torque applied to the fitting 166 results in a diminishing wall thickness at the flared end 146. The more the flare 146 is compressed or thinned, the more the flare 146 is susceptible to fatigue failure during the life of use of the entire fluid coupling. Further, at a predetermined high torque level, the hex flats 168 on the fitting 166 will begin to deform which may prevent the application of additional torque or prevent easy disassembly of the fluid coupling.

To overcome these problems, a fluid conduit 140, as shown in FIG. 14, is uniquely provided with a reduced resistance seal means 180 which sealingly closes any gap 178 which may exist between the exterior surface 154 on the flare end of the conduit 140 and the conical seat 158 in a receiver 160.

As described above in the earlier embodiments of the present invention, the reduced resistance seal means 180 is preferably in the form of a compressive, annular bead which is integrally formed as a unitary part of the second radially inward extending end 153 of the flare 146 on the conduit 140. The annular bead seal 180 may have any one of a number of different shapes or cross sections. For example, the bead seal 180 may have a generally arcuate shape, such as the illustrated spherical or elliptical shape shown in FIGS. 14 and 15. Alternately, the bead seal 180 may have a generally polygonal shape, such as a trapezoidal, triangular, rectangular, rhombic, etc. In addition, although one annular bead seal 180 is shown in FIGS. 14 and 15, multiple bead seals 180 having the same or different cross section shapes, as described above, may also be formed in a radially spaced manner on the second exterior surface 154 on the flare 146.

The reduced resistance bead seal 180 provides a smaller volume of material than that of the entire second portion 153 on the flare 146 so as to be easily deformable itself or to easily deform a softer mating element to conform the flare 146 to the mating element and thereby form a leak free seal therebetween at nominal or less than nominal torque levels. By example only, the reduced resistance bead 28 has a modulus of resiliance=15.0 in. lb/in$^3$, a relative toughness 15,700 and a total resiliance of bead seal=0.0200265 in. lb.

Figure 15:
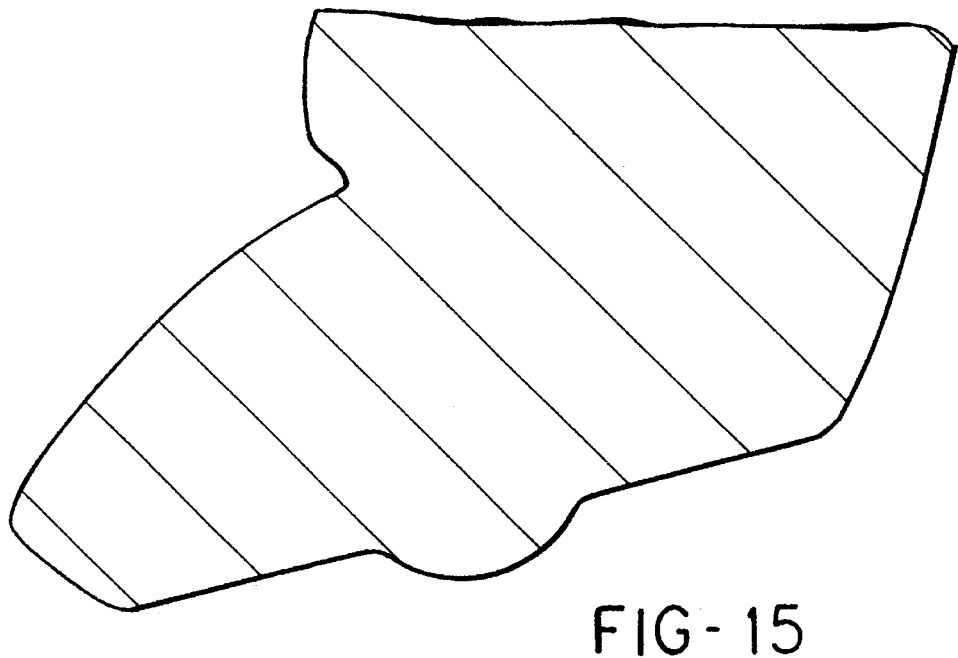
FIG. 15 is a pictorial representation of a longitudinal cross section through an actual conduit with an ISO flared end and a reduced resistance bead of the present invention.

FIG. 15 which is a photographic illustration of a cut away view of the flare 146 clearly shows the integral formation of the bead seal 180 with the flare 146 and the homogeneous construction of the bead seal 180 and the material forming the conduit 140.

Referring now to FIG. 16, there is illustrated a preferred location and shape for the bead seal 180 on the second inward extending portion 153 of the end flare 146. The bead seal 180 is located along the second exterior surface 154 on the flare 146 at any position between the outer end 152 and the tip 156. Preferably the bead seal 180 is located between the end 152 and is axially in line with the line of force application 190 on the flare 146. More preferably the center 196 of the bead 180 is axially aligned with the flat 188 such that force centered on the flat 188 will be applied along a line extending through the metal wall of the flare 146 to the center of the bead 196.

In an exemplary embodiment, the bead seal 180 has a generally arcuate shape with an outer surface which curves arcuately to the second exterior surface 154 on the flare 146. A first tangent 192 extending through the juncture of one end of the exterior surface of the bead 180 and the second exterior surface 154 on the flare 146 is normal to the line 190 of force application applied to the flare 146. A second tangent 194 through the opposite end of the bead 180 and the second exterior surface 154 extends parallel to the line 190 of force application.

This shape and location of the bead 180 places the radial center 196 of the bead 180, which is located on the second exterior surface 154 of the second radial portion 153 of the flare 146, axially in line with the line 190 of force application by the fitting 166, with the line 190 of force application extending completely through the solid metal side wall 142 of the conduit 140 to the radial center 196 of the bead 180. This prevents any axial inward bending of the second end portion 153 of the flare 146 adjacent the tip 156 toward the first radial portion 148 of the flare 146.

Another important feature in the bead 180 is also shown in FIG. 16. The maximum height or radius denoted by reference number 198 for the bead 180 is selected to ensure that the exterior surface of the bead 180 contacts a mating element, such as a conical seat 158 in a receiver 160, before the tip 156 engages the mating element or surface. This is achieved by selecting a maximum height or radius 198 for the bead 180 such that a line extending through the outermost point of the bead 180 and the tip 156 is disposed at a predetermined angle with respect to the second exterior surface 154 of the flare 146. Preferably, this angle 200 is substantially 2.5°. It will be understood that other angles provided by different height beads 180 may also be selected, as long as such dimensions ensure that the bead 180 contacts a mating element before the tip 156 engages the same element or mating surface. At a minimum, the height of the bead 180 is selected to insure at least simultaneous contact of the bead seal 180 and the tip 156 with the conical seat 158 in the receiver 160.

Figure 17:
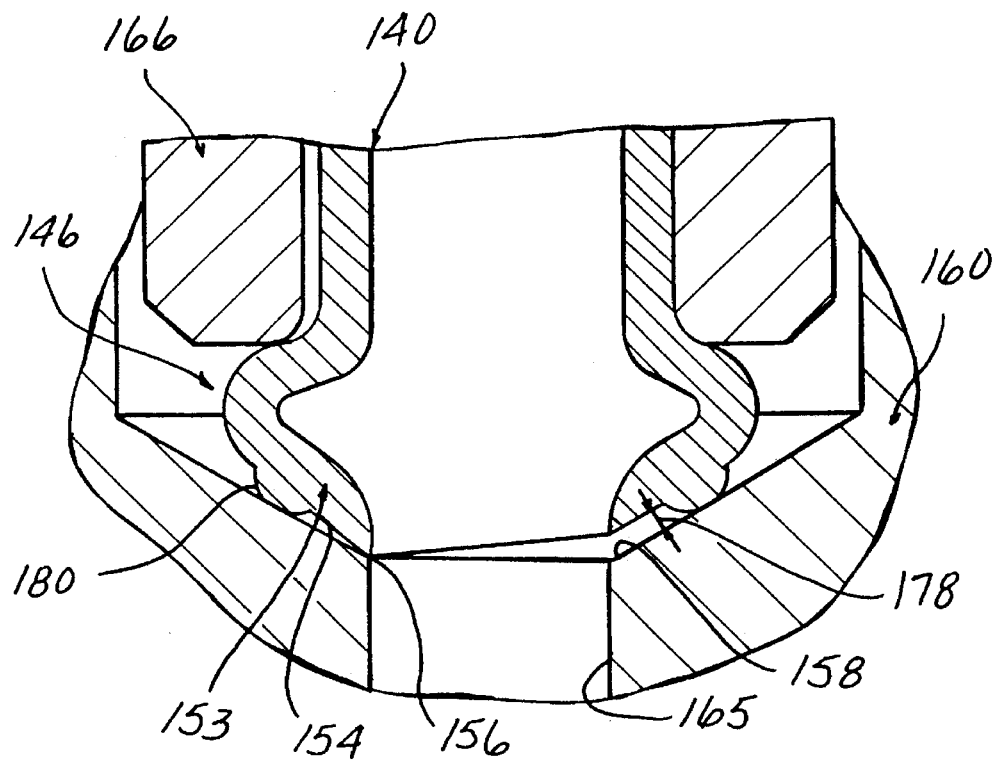
FIG. 17 is a cross sectional view showing the mounting of the conduit having the end flare and reduced resistance bead of the present invention in a receiver to close a gap between the conduit and the receiver.

FIG. 17 depicts the conduit 140 having the reduced resistance bead seal 180 formed thereon mounted in a fluid coupling formed of a receiver 160 having a conical seat 158 and a hollow bore 165, and a fitting 166 which threadingly engages the receiver 160, as described above and shown in FIGS. 12 and 13. FIG. 17 depicts the orientation of the components when a gap 178 is formed between the second exterior surface 154 of the flare 146 and the conical seat 158 in the receiver 160. When the flare 146 is compressed under threading action of the fitting 166 into the receiver 160, a portion of the annular bead seal 180, such as that shown in the left in FIG. 17, will engage and deform to a significant extent as it mates with the conical seat 158 in the receiver 160 until the tip 156 also engages the conical seat 158. A certain circumferential extent of the bead 180, as shown on the right in FIG. 17, will also engage the conical seat 158 in the receiver 160 thereby closing the gap 178 and forming a seal between the flare 146 and the conical seat 158 in the receiver 160, despite the fact that a portion of the tip 156 in the flare 146 is still spaced from the conical seat 158. It should be noted that this seal is achieved at nominal torque levels and not due to "over-torquing" as commonly used in prior art couplings.

Figure 18:
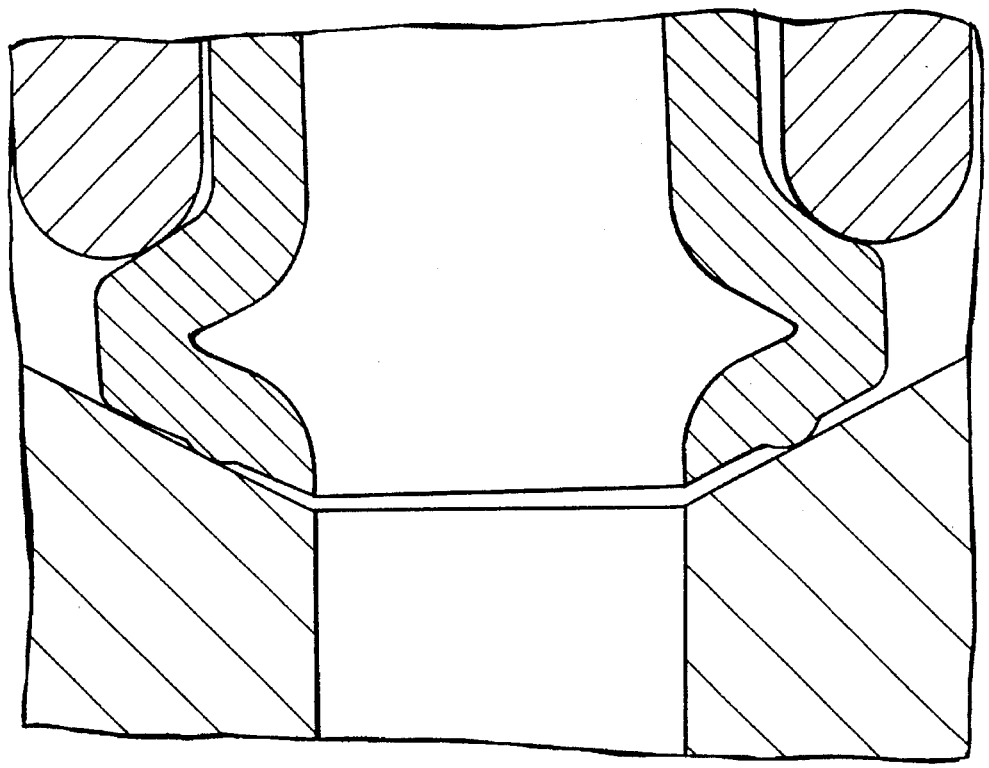
FIG. 18 is a pictorial representation of a longitudinal cross section through an actual conduit, fitting and receiver, similar to FIG. 17.

FIG. 18 is a photographic illustration, similar to FIG. 17, which clearly shows the redundant seal on the left side of the conduit 140, as viewed in FIG. 18, by the lip 156 and the bead 180 with the conical seat 158. On the right side of the conduit 140 only the bead 180 sealingly contacts the conical seat 158 and forms a seal therebetween.

FIG. 17 is based on the assumption that the material forming the receiver 160 is harder than the material used to form the conduit 140. In this condition,, the bead seal 180 undergoes substantially all of the deformation required to form a seal between the flare 148 and the conical seat 158 in the receiver 160.

Figure 19:
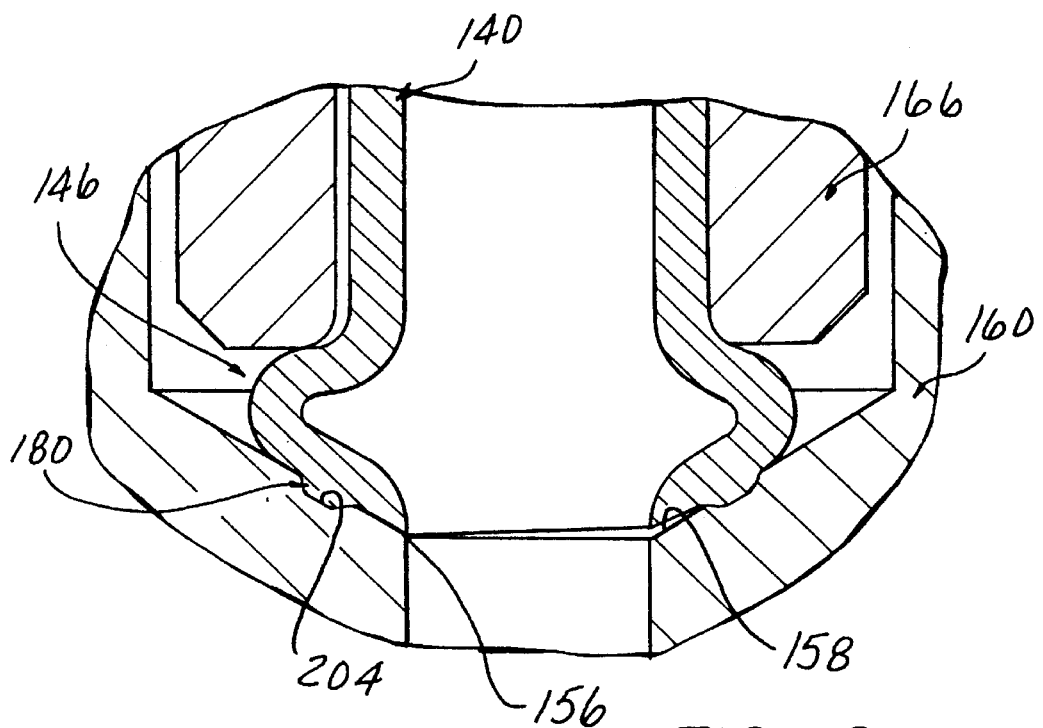
FIG. 19 is a cross sectional view showing a seal formed by the reduced resistance bead of the present invention by deformation of the receiver.

It is also possible that the material forming the receiver 160 is softer than the material used to construct the conduit 140. In this condition, as shown in FIG. 19, when the conduit 140 with the annular bead seal 180 of the present invention is forcibly engaged against the conical seat 158 in the receiver 160, the harder bead seal 180 will deform a portion of the conical seat 158 thereby forming a depression 204 extending along a predetermined circumferential extent of the conical seat 158. While forming the depression 204, the bead seal 180 also undergoes a small amount of deformation resulting in a slightly elongated bead shape from its original more generally arcuate shape as shown in FIG. 16. Besides sealing any gap between the flare 146 and the conical seat 158, this deformed elongated bead seal 180 and the depression 204 in the receiver 160 increases the seal path length between the flare 146.

Referring now to FIGS. 20–23, there is depicted a method and a unique tool used to form the reduced resistance bead 180 as well as the ISO flared end 146 on the conduit 140 to the shape depicted in FIG. 14.

Figure 20:
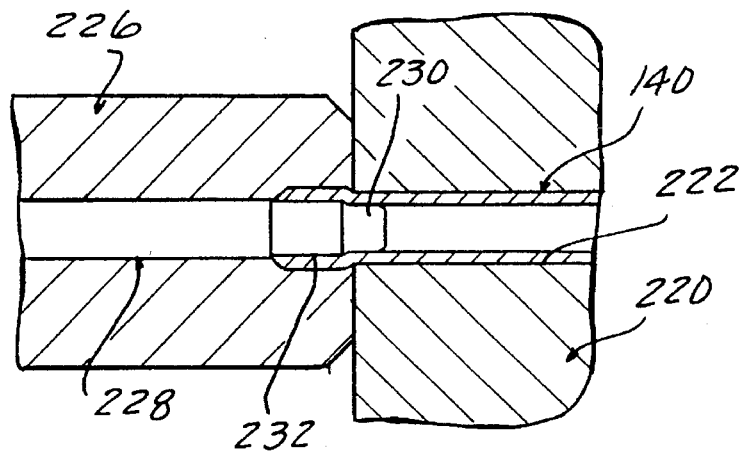
FIG. 20 is a cross sectional view showing the tooling used in the first step of a method of forming an ISO flared end of a conduit according to the present invention.

In FIG. 20, one of a pair of holding blocks or dies 220 is depicted. The holding block 220 includes an elongated groove or bore 222 of circular cross section, by example only, for receiving the conduit 140 therein. The bore 222 extends continuously through the holding block 220 from a closed end, not shown, to an opposed open end. The conduit 140 is mounted in the holding block 220, with the unformed first end extending outward from one end of the bore 222 in the holding block 220. A mating holding block, not shown, is then secured to the holding block 220 shown in FIG. 20 and a coining shell 226 is brought into engagement with the holding blocks 220.

A punch 228 with a first diameter portion adjacent a smaller diameter pilot nose 230 is slidably mounted in the shell 226. Inward movement of the punch 228 into the end of the conduit 140 causes the end portion 232 of the conduit 140 to enlarge to a slightly larger diameter than the nominal diameter of the conduit 140.

Figure 21:
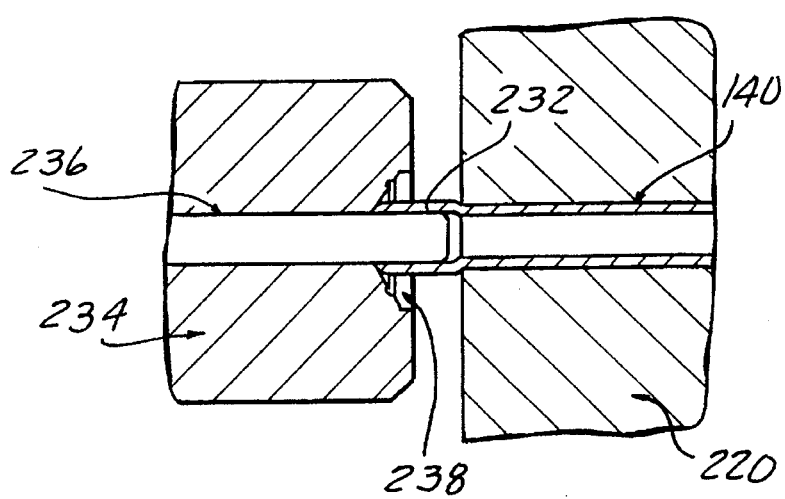
FIG. 21 is a cross sectional view showing the tooling used in the initial stage of the second step of the method of the present invention.
Figure 22:
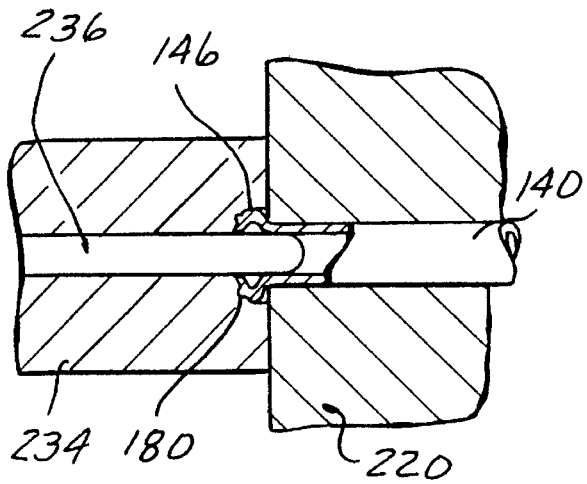
FIG. 22 is a cross sectional view showing the tooling used in the final stage of the second step of the method of the present invention to form a reduced resistance bead seal on one end of an ISO flared end of a conduit.

As shown in FIG. 21, another shell or tool 234, also having a slidable punch 236 is provided to complete the flared end 146. A recess 238 is formed in one end of the shell 234 and forms the end of the conduit 140 to the required angular shape of the second end portion 153 and the adjacent portions to the shape and size of the end 152 and first portion 148 of the flared end 146 as the shell 234 and the punch 236 advance into contact with the end of the conduit 140 as shown at an initial point of contact in FIG. 21 and at a final stage in FIG. 22.

Figure 23:
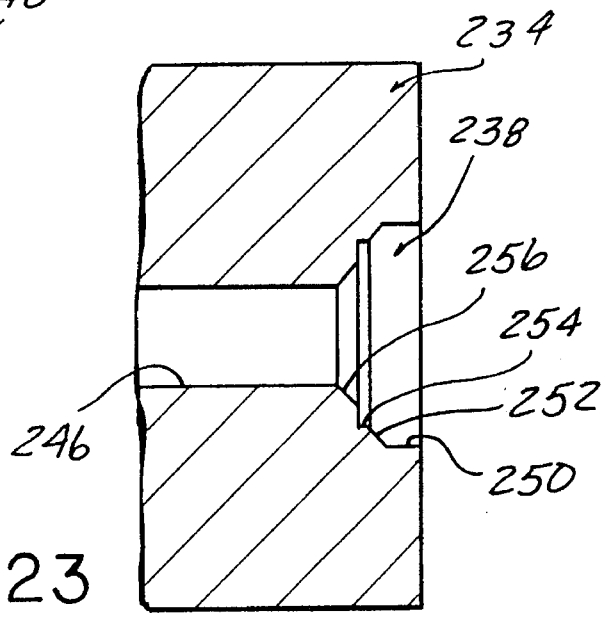
FIG. 23 is a partial, enlarged, cross sectional view of the tooling shown in FIG. 22.

As shown in greater detail in FIG. 23, the recess 238 is formed with a first generally circular diameter end portion 250 extending from the open end of the recess 238. A first inwardly angled, conical surface 252 is formed at the inner end of the first end portion 250 and is disposed at the dimensional angle of the second exterior face 154 of the flared end 146 of the conduit 140. An annular recess 254 is formed at an inner edge of the conical surface 252 and has the predetermined shape of the reduced resistance bead 180. The recess 254 opens to an innermost conical surface 256 disposed at the same angle as the conical surface 252 from the longitudinal axis of the recess 238.

In summary, there has been disclosed a unique mounting arrangement and method for forming a leak-free seal between the mating mounting faces of two members arranged in metal-to-metal contact. A reduced resistance seal or bead is integrally formed on the mounting surface of one member and undergoes deformation or causes deformation in the opposite mounting surface to account for any eccentricity, angular variance, or misalignment of the two members when the two members are urged into forced engagement. The reduced resistance bead of the present invention is easily formed on any component utilizing existing assembly methods such that it is usable as a drop-in replacement for existing components, such as fluid components, without requiring any modifications to the corresponding fittings, receivers or other mounting or connector elements. The unique reduced resistance bead also requires the same or less torque to join the fittings together to form the desired leak-free seal.

What is claimed is:

1. A fluid conduit for mounting in sealed relationship with a conical surface, the fluid conduit comprising:

an axially extending side wall having a first diameter, a first end, and a through bore;

the conduit flared radially outwardly from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit; and reduced resistance seal means in the form of an annular bead, integrally formed as a continuous, one-piece, outward extension of the second exterior surface of the conduit, for deformable sealing engagement with a conical surface;

a line through a center of the annular bead on the second exterior surface to the first exterior surface of the conduit extending completely through the material forming the conduit.

2. The fluid conduit of claim 1 wherein the reduced resistance seal means comprises:

an annular bead extending outward from the second exterior surface of the conduit.

3. The fluid conduit of claim 2 wherein:

the annular bead has an arcuate shaped exterior surface.

4. A fluid conduit for mounting in sealed relationship with a conical surface, the fluid conduit comprising:

an axially extending side wall having a first diameter, a first end, and a through bore;

the conduit flared radially outwardly from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit; and reduced resistance seal means in the form of an annular bead, integrally formed as a continuous, one-piece, outward extension of the second exterior surface of the conduit, for deformable sealing engagement with a conical surface, a height of the annular bead between the second exterior surface of the conduit and an outer peripheral surface of the annular bead being substantially one third of a thickness of the side wall of the conduit.

5. A fluid conduit for mounting in sealed relationship with a conical surface, the fluid conduit comprising:

an axially extending side wall having a first diameter, a first end, and a through bore;

the conduit flared radially outwardly from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at first end of the conduit; and reduced resistance seal means in the form of an annular bead, integrally formed as a continuous, one-piece, outward extension of the second exterior surface of the conduit, for deformable sealing engagement with a conical surface;

the first exterior surface on the conduit being formed with a first arcuate end portion extending from the axial wall of the conduit, a second arcuate portion extending to the outer end, and a flat formed between the first and second arcuate portions;

a center of a length of the annular bead on the second exterior surface of the conduit being axially aligned with the flat on the first exterior surface of the conduit.

6. A fluid conduit for mounting in sealed relationship with a conical surface, the fluid conduit comprising:

an axially extending side wall having a first diameter, a first end, and a through bore;

the conduit flared radially outwardly from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit; and reduced resistance seal means in the form of an annular bead, integrally formed as a continuous, one-piece, outward extension of the second exterior surface of the conduit, for deformable sealing engagement with a conical surface;

the first exterior surface on the conduit being formed with a first arcuate end portion extending from the side wall of the conduit, a second arcuate portion extending to the outer end, and a flat formed between the first and second arcuate portions;

a line through a center of the annular bead on the second exterior surface and the flat on the first exterior surface of the conduit extending completely through the material forming the conduit.

7. The fluid conduit of claim 6 wherein:

a tangent through one end of an exterior surface of the annular bead furthest from the tip being parallel to the line extending between the center of the annular bead and the flat on the first exterior surface of the conduit.

8. The fluid conduit of claim 7 wherein:

a tangent extending through the exterior surface at an opposite end of the annular bead is normal to the line extending between the center of the annular bead and the flat on the first exterior surface of the conduit.

9. A fluid conduit for mounting in sealed relationship with a conical surface, the fluid conduit comprising:

an axially extending side wall having a first diameter, a first end, and a through bore;

the conduit flared radially outwardly from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit; and reduced resistance seal means in the form of an annular bead, integrally formed as a continuous, one-piece outward extension of the second exterior surface of the conduit, for deformable sealing engagement with a conical surface, an angle between the second exterior surface of the conduit and a line extending between the tip and the radially outermost surface on the annular bead being substantially 2.5°.

10. The fluid conduit of claim 1 wherein:

the reduced resistance seal means is homogeneously formed from material forming the conduit.

11. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece extension of the second exterior surface of the conduit;

a line through a center of the annular bead on the second exterior surface to the first exterior surface of the conduit extending completely through the material forming the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat.

12. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece extension of the second exterior surface of the conduit;

a fitting having a through bore receiving the side wall of the conduit therethrough, an end surface on the fighting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat;

a first radial surface formed-on, and extending from the side wall of the conduit on the first exterior surface of the conduit;

a second radial surface formed between the first exterior surface and the outer ends;

an annular flat formed on the first exterior surface of the conduit between the first and the second radical surfaces; and wherein force exerted by the one end of the fitting on the first exterior surface of the conduit is centered through the flat.

13. The fluid conduit connector apparatus of claim 11 wherein:

the annular bead has an arcuate shaped exterior surface.

14. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece extension of the second exterior surface of the conduit;

a height of the annular bead between the second exterior surface of the conduit and an outer peripheral surface of the annular bead being substantially one third of at thickness of the side wall of the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat.

15. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece, outward extension of the second exterior surface of the conduit;

the first exterior surface on the conduit being formed with a first arcuate end portion extending from the side wall of the conduit, a second arcuate portion extending to the outer end, and a flat formed between the first and second arcuate portions;

a center of a length of the annular bead on the second exterior surface of the conduit being axially aligned with the flat on the first exterior surface of the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat.

16. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece extension of the second exterior surface of the conduit;

the first exterior surface on the conduit being formed with a first arcuate end portion extending from the side wall of the conduit, a second arcuate portion extending to the outer end, and a flat formed between the first and second arcuate portions;

a line through a center of the annular bead on the second exterior surface and the flat on the first exterior surface of the conduit extending completely through the material forming the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat.

17. The fluid conduit connector apparatus of claim 16 wherein:

a tangent through one end of an exterior surface of the annular bead furthest from the tip being parallel to the line extending through the center of the annular bead and the flat on the first exterior surface of the conduit.

18. The fluid conduit connector apparatus of claim 17 wherein:

a tangent extending through the exterior surface at an opposite end of the annular bead is normal to the line extending between the center of the annular bead and the flat on the first exterior surface of the conduit.

19. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece extension of the second exterior surface of the conduit;

an angle between the second exterior surface of the conduit and a line extending between the tip and an outermost surface on the annular bead being substantially 2.5°;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat.

20. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece outward extension of the second exterior surface of the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein;

the conical seat on the receiver means being parallel to a line extending between the tip and an outermost surface on the annular bead; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat.

21. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece outward extension of the second exterior surface of the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein, the conical seat being disposed at a converging angle with respect to a line extending between the tip and an outermost surface on the annular bead; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat.

22. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means in the form of an annular bead integrally formed as a continuous, one-piece outward extension of the second exterior surface of the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein;

means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat; and wherein the annular bead has a height from the second exterior surface such that the annular bead engages the conical seat in the receiver means before the tip engages the conical seat when the conduit is urged into forced engagement with the conical seat in the receiver means.

23. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means integrally formed as a continuous, one-piece extension of the second exterior surface of the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the reduced resistance seal means sealingly engages the entire annular extent of the conical seat;

the conduit being formed of a harder material than the material forming the conical seat of the receiver means such that the reduced resistance seal means deforms the conical seat of the receiver means and forms a depression in the conical seat filled by the reduced resistance seal means when the fitting, the first end of the conduit and the receiver means are forcibly urged together.

24. The fluid conduit connector apparatus of claim 11 wherein:

the conical seat of the receiver means is formed of a harder material than the material forming the conduit such that only the reduced resistance seal means deforms when the first end of the conduit is forcibly urged into engagement with the conical seat of the receiver means.

25. The fluid conduit connector apparatus of claim 11 wherein the fixedly attaching means comprises:

mating threads formed on the fitting and the receiver means for threadingly engaging the fitting and the receiver means.

26. A fluid conduit for mounting in sealed relationship with a conical surface comprising:

an axially extending side wall having a first diameter, a first end, and a through bore;

the conduit flared outwardly from the first diameter at a location spaced from the first end and forming a first conical wall having a first annular exterior surface, the first exterior surface terminating in a second diameter, annular outer end, an annular flat formed on the first exterior surface adjacent the outer end;

the conduit extending radially inward from the outer end to form a second conical wall having a second annular exterior surface, the second conical wall diverging from the first conical wall, the second exterior surface terminating in an annular tip at the first end of the conduit; and reduced resistance seal means, formed of an annular bead integrally formed as a continuous, one-piece extension of the second exterior surface of the conduit, for deformable sealing engagement with a conical surface;

a center of the annular bead on the second exterior surface of the conduit located between the outer end and the tip of the conduit;

the first exterior surface on the conduit formed with a first arcuate end portion extending from the side wall of the conduit and a second arcuate portion extending to the outer end, the flat formed between the first and second arcuate end portions;

a line through a center of the annular bead on the second exterior surface and the flat on the first exterior surface of the conduit extending completely through the material forming the conduit.

27. A fluid conduit for mounting in sealed relationship with a conical surface comprising:

an axially extending side wall having a first diameter, a first end, and a through bore;

the conduit flared outwardly from the first diameter at a location spaced from the first end and forming a first conical wall having a first annular exterior surface, the first exterior surface terminating in a second diameter, annular outer end, an annular flat formed on the first exterior surface adjacent the outer end;

the conduit extending radially inward from the outer end to form a second conical wall having a second annular exterior surface, the second conical wall diverging from the first conical wall, the second exterior surface terminating in an annular tip at the first end of the conduit; and reduced resistance seal means, formed of an annular bead integrally formed as a continuous, one-piece extension of the second exterior surface of the conduit, for deformable sealing engagement with a conical surface;

a center of the annular bead located on the second exterior surface of the conduit located between the outer end and the tip of the conduit; and the center of the annular bead on the second exterior surface of the conduit being axially in line with the flat formed on the first exterior surface of the conduit.

28. A fluid conduit for mounting in sealed relationship with a conical surface comprising:

an axially extending side wall having a first diameter, a first end, and a through bore;

the conduit flared outwardly from the first diameter at a location spaced from the first end and forming a first conical wall having a first annular exterior surface, the first exterior surface terminating in a second diameter, annular outer end, an annular flat formed on the first exterior surface adjacent the outer end;

the conduit extending radially inward from the outer end to form a second conical wall having a second annular exterior surface, the second conical wall diverging from the first conical wall, the second exterior surface terminating in an annular tip at the first end of the conduit; and reduced resistance seal means, formed of an annular bead integrally formed as a continuous, one-piece extension of the second exterior surface of the conduit, for deformable sealing engagement with a conical surface;

a center of the annular bead located on the second exterior surface of the conduit located between the outer end and the tip of the conduit; and a height of the annular bead between the second exterior surface of the conduit and an outer peripheral surface of the annular bead being substantially one third of a thickness of the side wall of the conduit.

29. The fluid conduit of claim 26 wherein:

the reduced resistance seal means is homogeneously formed from the material forming the conduit.

30. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end;

the conduit extending radially inward from the outer end to form a second conical wall having a second annular exterior surface, the second conical wall diverging from the first conical wall, the second exterior surface terminating in an annular tip at the first end of the conduit;

reduced resistance seal means, formed of an annular bead integrally formed as a continuous, one-piece extension of the second exterior surface of the conduit, the annular bead located on the second exterior surface between the outer end and the tip;

a line through a center of the annular bead on the second exterior surface and the first exterior surface of the conduit extending completely through the material forming the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the annular bead sealingly engages the entire annular extent of the conical seat.

31. A fluid conduit connector apparatus comprising:

a conduit having an axially extending side wall at a first diameter, a first end, and a through bore;

the conduit flared radially outward from the first diameter at a location spaced from the first end and forming a first conical wall having a first annular exterior surface, the first exterior surface terminating in a second diameter, annular outer end, a flat formed on the first exterior surface;

the conduit extending radially inward from the outer end to form a second conical wall having a second annular exterior surface, the second conical wall diverging from the first conical wall, the second exterior surface terminating in an annular tip at the first end of the conduit;

reduced resistance seal means, formed of an annular bead integrally formed as a continuous, one-piece extension of the second exterior surface of the conduit, the annular bead located on the second exterior surface between the outer end and the tip;

a center of the annular bead on the second exterior surface of the conduit being axially in line with the flat formed on the first exterior surface of the conduit;

a fitting having a through bore receiving the side wall of the conduit therethrough, an end surface on the fitting engaging the first exterior surface on the conduit;

receiver means, having a conical seat formed therein and a hollow bore extending centrally from the conical seat, for receiving the conduit and the fitting therein; and means for fixedly attaching the fitting to the receiver means to engage the end surface of the fitting with the first exterior surface on the conduit and to compress the second exterior surface of the conduit into engagement with the conical seat in the receiver such that at least one of the tip and the annular bead sealingly engages the entire annular extent of the conical seat.

32. The fluid conduit connector apparatus of claim 31 wherein:

the reduced resistance seal means is homogeneously formed from material forming the conduit.

33. The fluid conduit connector apparatus of claim 31 wherein:

a height of the annular bead between the second exterior surface of the conduit and an outer peripheral surface of the annular bead is substantially one third of a thickness of the side wall of the conduit.

34. A method of sealingly joining a fluid conduit having a through bore to a mating member comprising the steps of:

forming a flared end on a conduit, the flared end having a first conical wall portion with a first exterior surface extending radially outwardly from an axially extending side wall of the conduit to an outer end at a diameter greater than a diameter of the conduit and a second conical wall portion extending radially inward toward a longitudinal axis of the conduit and diverging from the first conical wall portion, the second conical wall portion having a second exterior surface and terminating in a tip at one end of the conduit;

forming a reduced resistance annular bead seal as a continuous, homogeneous extension of the second conical wall portion, the reduced resistance annular bead seal projecting outward from the second exterior surface such that a line through a center of the annular bead on the second conical wall portion to the first exterior surface of the conduit extends completely through the material forming the conduit;

mounting the axial side wall of the conduit in a bore in a fitting with the flared end of the conduit extending axially from one end of the fitting;

mounting the conduit and the fitting in a mating member having a conical seat surrounding one end of a bore in the mating member;

forcibly engaging the fitting and the mating member such that the one end of the fitting exerts a predetermined force on the first exterior surface of the flared end of the conduit to engage at least a portion of one of the tip and the reduced resistance annular bead seal with the conical seat to form a complete annular seal about the one end of the bore in the mating member.

35. The method of claim 34 wherein the step of forming the reduced resistance seal further comprises the step of:

forming an annular bead homogeneously from and projecting outwardly from the second exterior surface of the flared end of the conduit.

36. A method of sealingly joining a fluid conduit having a through bore to a mating member comprising the steps of:

forming a flared end on a conduit, the flared end having a first conical wall portion with a first exterior surface extending radially outwardly from an axially extending side wall of the conduit to an outer end at a diameter greater than a diameter of the conduit and a second conical wall portion extending radially inward toward a longitudinal axis of the conduit and diverging from the first conical wall portion, the second conical wall portion having a second exterior surface and terminating in a tip at one end of the conduit;

forming a reduced resistance seal as a continuous, homogeneous extension of the second conical wall portion, the reduced resistance seal projecting outward from the second exterior surface;

mounting the axial side wall of the conduit in a bore in a fitting with the flared end of the conduit extending axially from one end of the fitting;

mounting the conduit and the fitting in a mating member having a conical seat surrounding one end of a bore in the mating member;

forcibly engaging the fitting and the mating member such that the one end of the fitting exerts a predetermined force on the first exterior surface of the flared end of the conduit to engage at least a portion of one of the tip and the reduced resistance seal with the conical seat to form a complete annular seal about the one end of the bore in the mating member; and during the step of forcibly engaging the fitting and the mating member, deforming the reduced resistance seal to the extent necessary to close any gap existing between the tip of the flared end of the conduit and the conical seat in the mating member.

37. A method of sealingly joining a fluid conduit having a through bore to a mating member comprising the steps of:

forming a flared end on a conduit, the flared end having a first conical wall portion with a first exterior surface extending radially outwardly from an axially extending side wall of the conduit to an outer end at a diameter greater than a diameter of the conduit and a second conical wall portion extending radially inward toward a longitudinal axis of the conduit and diverging from the first conical wall portion, the second conical wall portion having a second exterior surface and terminating in a tip at one end of the conduit;

forming a reduced resistance seal as a continuous, homogeneous extension of the second conical wall portion, the reduced resistance seal projecting outward from the second exterior surface;

mounting the axial side wall of the conduit in a bore in a fitting with the flared end of the conduit extending axially from one end of the fitting;

mounting the conduit and the fitting in a mating member having a conical seat surrounding one end of a bore in the mating member;

forcibly engaging the fitting and the mating member such that the one end of the fitting exerts a predetermined force on the first exterior surface of the flared end of the conduit to engage at least a portion of one of the tip and the reduced resistance seal with the conical seat to form a complete annular seal about the one end of the bore in the mating member; and forming the reduced resistance seal with a predetermined height projecting from the second exterior surface such that the reduced resistance seal contacts the conical seat in the mating member before the tip contacts the conical seat in the mating member as the fitting is forcibly engaged with the mating member.

38. A method of sealingly joining a fluid conduit having a through bore to a mating member comprising the steps of:

forming a flared end on a conduit, the flared end having a first conical wall portion with a first exterior surface extending radially outwardly from an axially extending side wall of the conduit to an outer end at a diameter greater than a diameter of the conduit and a second conical wall portion extending radially inward toward a longitudinal axis of the conduit and diverging from the first conical wall portion, the second conical wall portion having a second exterior surface and terminating in a tip at one end of the conduit;

forming a reduced resistance seal as a continuous, homogeneous extension of the second conical wall portion, the reduced resistance seal projecting outward from the second exterior surface;

mounting the axial side wall of the conduit in a bore in a fitting with the flared end of the conduit extending axially from one end of the fitting;

mounting the conduit and the fitting in a mating member having a conical seal surrounding one end of a bore in the mating member;

forcibly engaging the fitting and the mating member such that the one end of the fitting exerts a predetermined force on the first exterior surface of the flared end of the conduit to engage at least a portion of one of the tip and the reduced resistance seal with the conical seat to form a complete annular seal about the one end of the bore in the mating member; and locating a center of the reduced resistance seal on the second exterior surface axially in line with the center of force applied by the one end of the fitting on the first exterior surface of the flared end of the conduit.

* * * * *